Feb. 9, 1960 H. L. HORWITZ ET AL 2,924,663

PARTY-LINE AUTOMATIC TELEPHONE SYSTEM

Filed July 1, 1954 2 Sheets-Sheet 1

INVENTOR
H. L. HORWITZ
M. E. HOMAN
BY
ATTORNEY

PARTY-LINE AUTOMATIC TELEPHONE SYSTEM

Filed July 1, 1954

2 Sheets-Sheet 2

INVENTOR
H. L. HORWITZ
M. E. HOMAN
BY
E. O. Phinney
ATTORNEY

United States Patent Office 2,924,663

Patented Feb. 9, 1960

2,924,663

PARTY-LINE AUTOMATIC TELEPHONE SYSTEM

Henry Leopold Horwitz, Nutley, and Merle Edward Homan, Bloomfield, N.J., assignors to International Telephone and Telegraph Corporation, New York, N.Y., a corporation of Maryland Application July 1, 1954, Serial No. 440,746

16 Claims. (Cl. 179—17)

Figure 1:
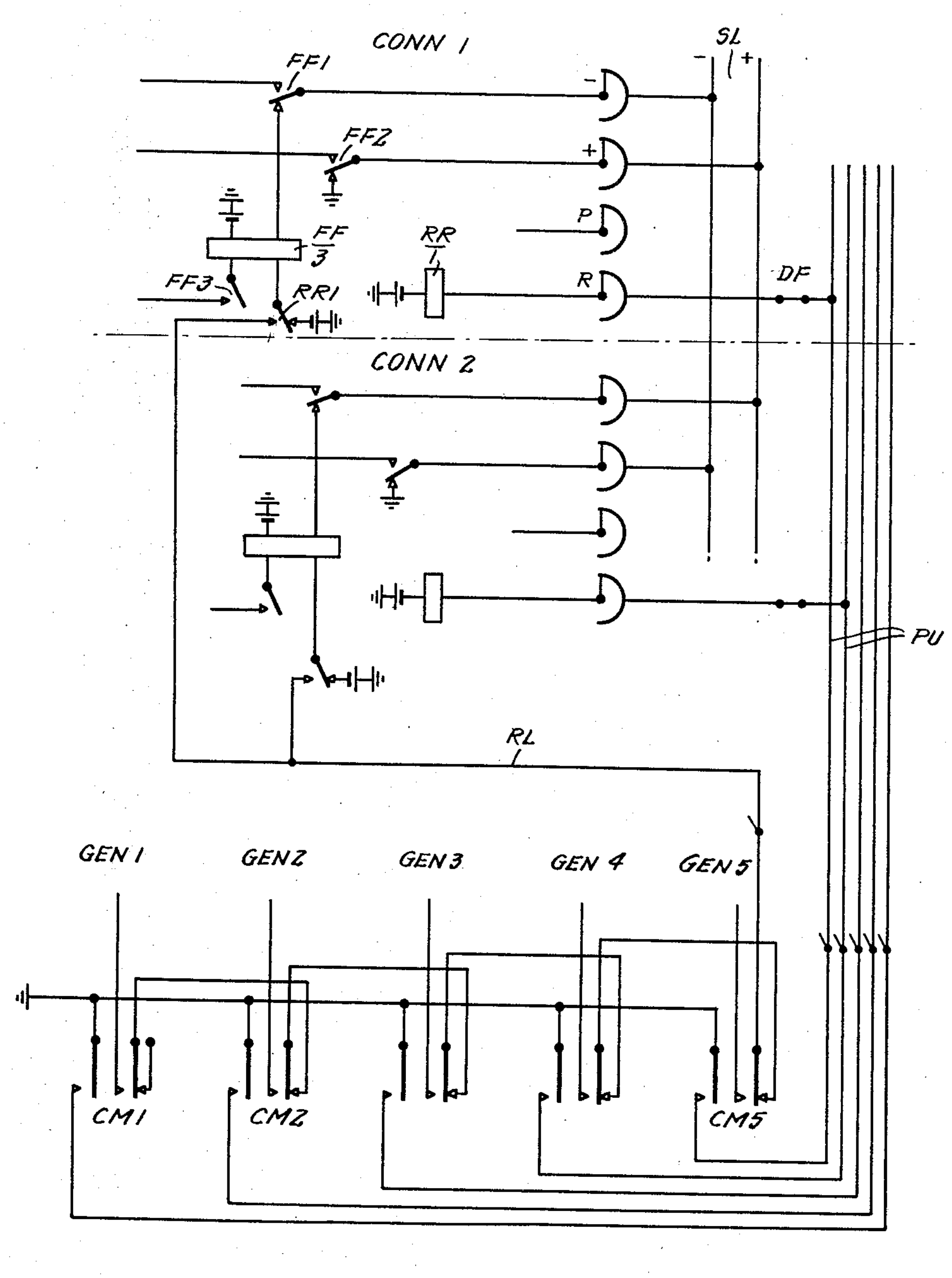

This invention relates to selective ringing party-line telephone systems in general but is concerned more particularly with party-line systems in which the source of ringing current for signalling a called subscribed is determined by a terminal per station in the connector switch.

The invention relates, more specifically, to a selective ringing party-line system of the kind described in U.S. Patent 1,727,133, Richardson et al., issued September 3, 1929 in which the ringing of called stations is divided into as many periods as there are stations on a line, and ringing curent of the proper frequency or character to signal one station only is applied to a common ringing circuit during each period. Thus, to call a desired station on the party-line, it is only necessary to connect the common ringing circuit to the line during the proper period. This may be accomplished by a ringing relay in the connector switch circuit which is connected to one of a plurality of pick-up or control conductors, depending upon the identity of the station which it is desired to call. The ringing relay, upon energizing over one of the control conductors, which it does when the source of ringing correspoding to the control conductor in use is connected to the common ringing circuit, connects the common ringing circuit to the called line and maintains the connection until the end of that ringing period. Each time that the particular ringing period recurs the ringing relay operates in the same manner until the called station answers.

A complete exchange is preferably installed with a plurality, say five, common ringing leads, and in order to equalize the loads on the ringing generators, the interrupters which interrupt the current from the respective generators and apply it to the common ringing leads, are so arranged that the frequencies are "slipped" as between the respective common ringing leads; that is to say, during the time period that the first frequency ringing generator is connected to the first ringing lead, the second frequency ringing generator is connected to the second ringing lead, the third generator to the third lead and so on. This necessitates the provision of five groups of five control conductor distribution leads to accomplish the proper frequency selection from the respective five common ringing leads.

Since the distribution leads are connected in practice over distribution frame jumper wires to a large number of marking terminals in the connector switches, the possibility exists that a false ground on one of the distribution leads will seriously interfere with the operation of the exchange, and it is a principal object of the invention to provide a means for testing, locating and isolating faults on these leads.

According to one feature of the invention, therefore, in a selective party-line telephone system comprising a ringing apparatus for periodically altering the character of the ringing current applied to a common ringnig circuit and a plurality of ringing control conductors each corresponding to a different character of the ringing circuit and each grounded in turn, means is provided for automatically actuating an alarm circiut responsive to the existence of a false or accidental ground on any one of the control conductors. Manually operable switch means is also provided for locating the control conductor on which the fault exists and for isolating it until the fault is removed.

According to a further feature of the invention, means is provided for automatically giving an alarm and for transferrng the common ringing circuit and control conductors to a stand-by interrupter mechanism and a stand-by set of ringing generators in the view of a power failure or a failure of one of the ringing generators. In the case of a power failure, when the fault is repaired automatic means is provided for transferring back the ringing circuit and control conductors to the normal set of equipment, whilst in case of a failure in one of the ringing generators, the re-transfer is effected manually.

Figure 2:
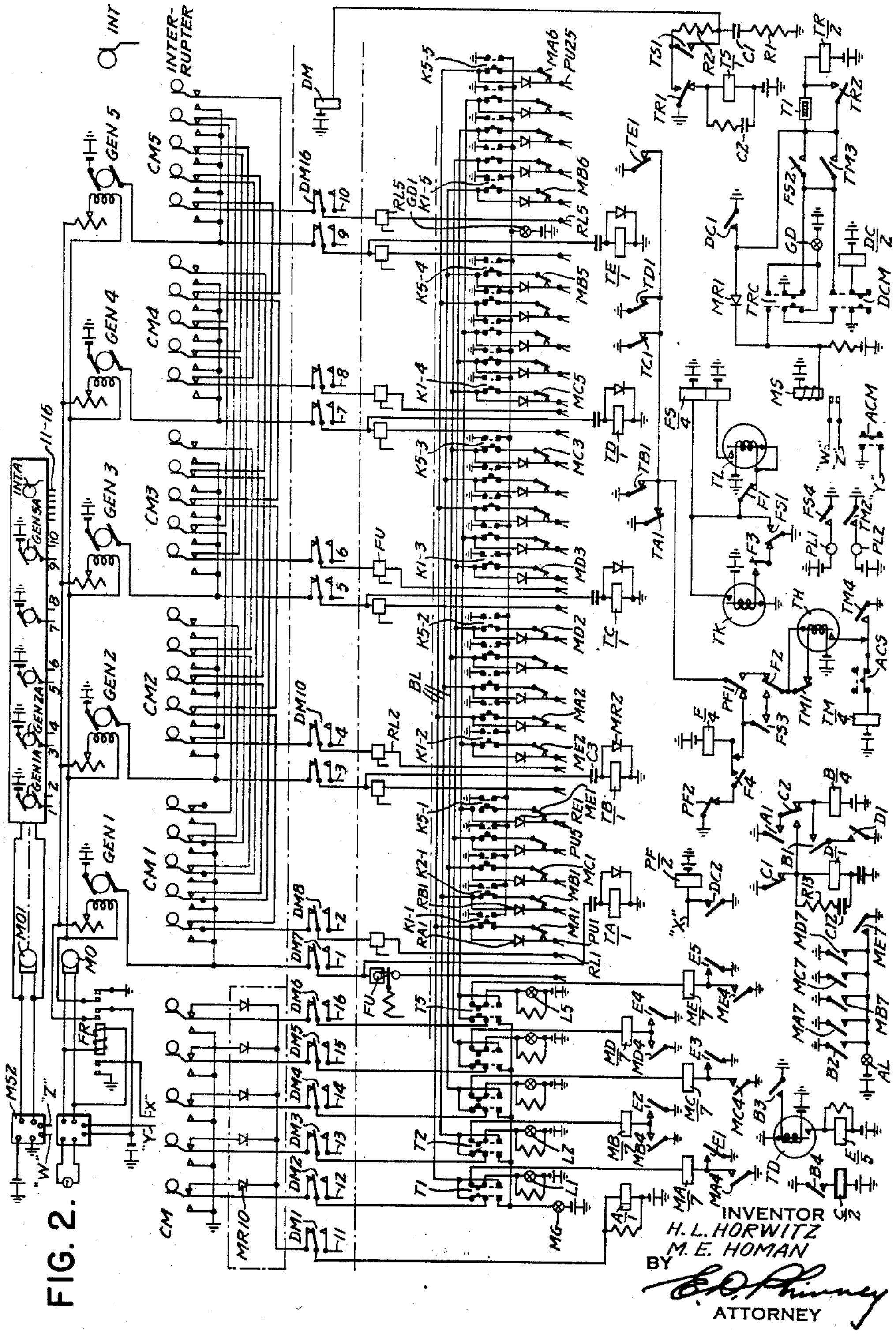

The above and other objects and features of the invention will be explained in the following detailed description with reference to the accompanying drawings, comprising Figs. 1 and 2, which show a sufficient amount of equipment in a system embodying the invention, to enable the invention to be explained and understood. In the drawings:

Fig. 1 is a circuit diagram showing sufficient of a known system of selective party line ringing to which our invention may be applied, and Fig. 2 is a circuit diagram of a preferred arrangement of the ringing and testing equipment of our invention.

Referring now to Fig. 1, this shows two connectors CONN1 and CONN2 of which each set of bank contacts represents a station which may be a station on an individual line or station on a party line, such as SL. Conductors GEN1, GEN2 . . . GEN5 extend from harmonic ringing generators to cam contact sets CM1, CM2 . . . CM5 of an interrupter whereby ringing current from the respective generators is connected in turn for timed intervals to the common ringing lead RL, so as to furnish ringing current of the proper frequencies to selectively operate the tuned ringers on the party line. The cam operated contacts CM1, CM2 . . . CM5 are also arranged to ground in turn five ringing control or pick-up conductors PU during the intervals that the ringing currents are connected to the common ringing lead RL.

In order to choose between the five sources of ringing current when any particular station is called, a pick-up or ringing relay, such as relay RR of the connector CONN1 is provided for each conector. This relay RR is connected to the ringing wiper R and is controlled in accordance with the connection over a distributing frame DF of the bank contacts engaged by the wipers R to the proper one of the pick-up conductors PU, and when energized connects the common ringing lead RL through a winding of relay FF at the same time that the desired frequency of ringing current is placed on the common ringing lead RL over the cam operated contacts CM1, CM2, etc. The correct pick-up conductor PU is, therefore, connected back to the ringing current terminal of each station and provides for controlling the ringing reliy RR in such a manner that the common ringing lead RL is connected to the called line during the time when it is carrying the desired one of the five frequencies of ringing current, the time at which the lead RL is connected to a called line depending in any one case upon which of the five ringing control leads PU is connected to the contact in the bank of wiper R. Upon the reply of the called station the relay FF operates, locks up over its contacts FF3 and at contacts FF1 and FF2 disconnects the ringing current from the called line.

The ringing and test equipment of Fig. 2 comprises a normally-used alternating current motor MO which drives the harmonic ringing generators GEN1, GEN2 . . . GEN5 and the interrupter INT, and a stand-by direct current motor MO1 arranged to drive stand-by generators GEN1A, GEN2A . . . GEN5A and stand-by interrupter INTA. The interrupter comprises cam operated contact groups CM, CM1 . . . CM5. The conductors 1 to 16 from the normally-used and stand-by interrupters and generators are connected over change-over micro-switches DM1, DM2 . . . DM16, adapted to be actuated by a magnet DM to extend the conductors 1 to 16 to sets of test keys T1, T2 . . . T5, K1–1, K2–1 . . . K5–1, etc., and to the test circuits shown at the bottom of the figure.

*Ringing failure*

Under normal operating conditions the ringing currents are produced by the A.C. motor driven generators GEN1, GEN2 . . . GEN5, Fig. 2, and the relays TA, TB . . . TE are all energized by current from the ringing generators. If a ringing failure occurs in one of these generators, say GEN2, the relay TB restores and a circuit is closed for a thermal relay TH over contacts TB1, PF1, F2 and TM1, the relay PF being operated over the lead "x" from the motor circuit where relay FR is energized in parallel with the A.C. motor MO. The condensers, such as C3, and the shunt rectifiers, such as MR2, permit relays TA, TB . . . TE to operate on ringing current only. The thermal relay TH operates after a short delay (for example, 30 seconds) and closes a circuit for a relay TM over contacts TB1, PF1, F2. Relay TM locks up over its contacts TM4, at contacts TM1 opens the circuit of relay TH, at contacts TM2 closes the circuit for an urgent alarm lamp PL2, and at contacts TM3 closes a circuit for a power relay MS over contacts of switch TRC and rectifier MR1 and a circuit in series with the thermistor T for the relay TR. Relay MS operates and closes over leads "w," "z," the circuit of the starting switch MS2 for the stand-by direct current motor driven equipment. The stand-by generators GEN1A, GEN2A . . . GEN5A, and the stand-by interrupter INTA are now driven by the D.C. stand-by motor MO1.

Thermistor T, which is a negative resistance device, delays the operation of relay TR for one or two seconds. Relay TR shunts the thermistor T at contacts TR2 so that it will cool off in preparation for subsequent operation, at contacts TR1 connects ground to one side of the winding of the magnet DM via contacts TS1 of a normally operated relay TS, and at contacts TR1 also opens the circuit of relay TS. Resistor R1 and condensor C1 are provided to prevent sparking at the contacts TR1. The energization of the magnet DM actuates the microswitches DM1, DM2 . . . DM16, which transfer the leads from the test keys T1, T2, etc., from the normally-used ringing generators GEN1, GEN2, etc., and interrupter INT to the stand-by generators GEN1A, GEN2A, etc., and stand-by interrupter INTA. After a short delay due to the discharge of the condenser C2 across its winding, relay TS releases and at contacts TS1 inserts a 100 ohm resistor R2 in series with the magnet DM to reduce its holding current to a value safe for continuous operation. The delay in transferring from the normally-used generators to the stand-by generators due to the time required to heat the thermistor T, permits the direct current motor driven ringing equipment to start without load. After the transfer change-over switches DM1, DM2 . . . DM16 have operated, relays TA . . . TE again operate and the stand-by equipment now provides the ringing and timed interruptions required by the office.

When the ringing failure in the A.C. motor driven equipment has been repaired and it is desired to revert to the normal equipment, the operator actuates the key ACS.

Relay TM is thereby deenergized, at contacts TM2 removes the urgent alarm signal given by the lamp PL2 and at contacts TM3 opens the circuit to relays TR and MS. Relay TR restores and transfers the load from the D.C. motor stand-by equipment to the A.C. motor driven equipment by opening the circuit of the magnet DM which in turn transfers the ringing and interrupter load from the stand-by equipment to the A.C. motor driven equipment. The power relay MS releases and permits the D.C. stand-by motor driven equipment to revert to the stand-by condition.

*Power failure*

If there is a power failure in the supply to the normally used A.C. motor driven equipment, the relay FR de-energizes and opens the circuit over lead "x" to relay PF. The circuits to relays TA . . . TE are also de-energized. Relay PF releases and closes a circuit over back contact PF1 for relay F which locks up over contacts F4 and PF2. Relay F closes a circuit over contacts F3 and FS1 for a thermal relay TK, and at contacts F1 opens a point in the circuit of thermal relay TL. Relay TK operates after a short delay (for example, fifteen seconds) and closes a circuit for the upper winding of relay FS. Relay FS operates, at contacts FS1 prepares another circuit for its upper winding and opens the circuit of the thermal relay TK, at contacts FS2 closes the circuit of relays MS and TR, closes the circuit of the thermal relay TH over TM1, F2, FS3, PF1 and at contacts FS4 closes a circuit for a lamp PL1 to give a non-urgent alarm. Relay TR and magnet DM operate, as described in connection with a ringing failure, to transfer the load to the stand-by ringing generators and after the transfer switches DM1, DM2, etc. have operated relays TA . . . TE energise and open the circuit of the thermal relay TH to prevent a ringing failure alarm being initiated.

*Transferring back to A.C. motor driven ringing equipment upon repair of a power failure*

When the A.C. motor driven equipment is running again, the circuit to the relay PF is closed over the conductor "x." Relay PF operates and at contacts PF2 opens the circuit to relay F. Relay F restores and at contacts F1 closes the circuit to the thermal relay TL. Relay TL operates and closes a circuit for the lower winding of relay FS. Relay FS is so wired that the magnetic fields generated by its windings oppose one another. Relay FS, therefore, now restores, opens at contacts FS1 both its locking and its releasing circuit and opens the circuit to the thermal relay TL, at contacts FS2 opens the circuit to relays MS of TR and at contacts FS4 extinguishes the non-urgent alarm signal lamp PL1. Relay TR restores and transfers the load from the D.C. motor driven stand-by equipment to the A.C. motor equipment by opening the circuit of magnet DM. Relay MS restores and permits the D.C. motor driven equipment to return to the stand-by condition.

*Testing or repairing without interference from equipment not under test*

If the D.C. motor driven stand-by equipment is to be repaired whilst the A.C. motor driven equipment carries the load, the key TRC should be operated. Operation of the key TRC prevents the operation of relay MS and TR in case of failure in the A.C. motor driven equipment, thus preventing transfer to the D.C. motor driven stand-by equipment and possible injury to a repair man. Key TRC also closes a circuit over supervisory lamp GD to indicate that the D.C. motor driven stand-by equipment is not available at this time.

When the D.C. motor driven stand-by equipment is again available for use, the key TRC should be returned to its normal position to allow the transfer to the D.C. motor driven equipment in case of failure in the A.C. motor driven equipment.

If it is desired to make a test run on the D.C. motor driven stand-by equipment whilst the A.C. motor driven equipment carries the load, keys TRC and DCM should both be operated.

Key TRC causes the operations described in the two preceding paragraphs whilst the key DCM closes a circuit for the power relay MS, which energizes and causes the D.C. motor driven stand-by equipment to operate and thus perform a test run. The rectifier MR1 is provided to prevent the operation of relay TR when the relay MS is thus energized.

When the test run is completed, the key DCM is returned to its normal position in order not to run the D.C. stand-by equipment needlessly.

Under the conditions described in the two preceding paragraphs the key TRC should be operated before the key DCM and the key DCM should be restored before the key TRC in order to prevent unnecessary transfer of the load.

If it is desired to make a test run on the A.C. motor driven equipment, it is necessary to operate the key DCM. The key DCM closes a circuit to relay DC and lights the lamp GD, which indicates that the A.C. motor driven equipment is not available at this time. Relay DC closes at contacts DC1 the circuit to relays MS and TR, and at contacts DC2 closes a multiple circuit to the relay PF. Thus the A.C. motor driven equipment may be shut down without bringing in a power failure alarm. Relays MS and TR when operated start the D.C. motor driven equipment and transfer the load, as already described.

When the test run is over, the key DCM is returned to its normal position in order to transfer the load back to the A.C. motor driven equipment and to return the D.C. motor driven equipment to the stand-by condition. The relay DC and in turn the relays MS and TR restore when the circuit to the relay DC is opened by the key DCM and cause this last-mentioned transfer. The lamp GD is extinguished when relay DC restores and the release of relay DC also restores the power failure alarm circuit by opening the multiple circuit of relay PF at contacts DC2.

Before making a repair to the A.C. motor driven equipment it is necessary to pull the main fuses or open the circuit breaker, and to operate the key DCM to prevent a power failure alarm from being given and to insure transfer of the load to the D.C. motor driven stand-by equipment as previously described.

*Testing for ground marking distribution leads*

In the embodiment shown in Fig. 2, five common ringing leads RL1, RL2 . . . RL5 are provided, each connected over a fuse such as FU and transfer contacts DM8, DM10, etc., to the contact springs of a group of cam operated interrupter springs CM1, CM2, etc., to the respective ringing generators GEN1, GEN2, etc., and in order to equalize the loads on the ringing generators, the cam operated springs CM1, CM2, etc., are so connected up that the frequencies are "slipped" as between the respective common ringing leads RL1, RL2, etc., that is to say, during the time period that the first ringing generator GEN1 is connected to the first ringing lead RL1, the second frequency ringing generator GEN2 is connected to the second ringing lead RL2, the third generator GEN3 to the third ringing lead RL3, and so on. This necessitates the provision of five groups of five control conductor distribution leads PU1 to PU25 to accomplish the proper frequency selection from the respective five common ringing leads. For this purpose the contacts of the cam-operated marking interrupter spring group CM are connected over the change-over switches DM1, DM2, etc., and test keys T1, T2, etc. to five bus leads BL which are connected over test keys K1–1, K2–1, etc., to the respective pick-up leads PU1 to PU25, in such manner that the periods in which these leads are grounded are correlated to the order in which the ringing currents are applied to the common ringing leads RL1, RL2, etc.

The marking springs CM which are not operated at a particular instant extend a metallic connection from the associated marking distribution leads PU1 to PU25 over contacts of relays MA, MB, MC, MD and ME, test keys K1–1, K2–1, etc., T1, T2, etc., switches DM2, DM3, etc., and rectifiers MR10, which block the D.C. passage from one marking lead to another, to a common test circuit (over contacts of the change-over switch DM1). A false ground on any of the marking leads is extended via this connection to battery through the winding of a relay A which is made slow to operate in order to prevent its operation during transient conditions. Operation of relay A closes at contacts A1 a circuit to relay B. Relay B in operating locks under the control of relay D, closes at contacts B2 the circuit of a separate ringing failure alarm circuit, including lamp AL, at contacts B3 closes a circuit for a thermal time delay relay TD, and at contacts B4 closes a circuit for a relay C. Relay C at contacts C1 and C2 transfers the operating circuit of relay D from direct ground at C1 to ground via C2 and make contacts A1 of relay A. The momentary release of relay A for periods of approximately less than one second will not release relay D due to the discharge current from the 40 mf. condenser C12 across it winding in series with resistor R13. Thus the normal operate period of the interrupter will not actuate the alarm circuit. If the false ground remains for more than fifteen seconds the thermal relay TD operates and closes a circuit for relay E. Relay E in operating closes at contacts E1, E2 . . . E5 the circuits to relays MA, MB, MC, MD and ME in series with lamps L1, L2 . . . L5, respectively. These lamps will light dimly at this time on account of the resistance of the relay windings. Relays MA, MB, MC, MD and ME in operating close locking circuits for themselves and at contacts MA1, MB1, etc., insert rectifiers RA1, RB1, etc., in series with the marking distribution leads PU1 to PU25, thereby isolating the false ground by blocking it from the four other splits common to the same interrupter cam spring unit.

The test man is now able to locate which of the twenty-five marking distribution leads PU1—PU25 is grounded by the following procedure:

(1) First operate the test keys T1 . . . T5, one at a time, to complete a direct circuit from the marking distribution leads BL to the test lamps L1, L2, etc. As these keys T1, T2, etc., are operated the relays MA, MB . . . ME are unlocked.

(2) The monitoring lamp MG should light on the normal ground pulses from the interrupter spring group CM associated with the operated test key T1, T2, etc.

(3) The bright lighting of a test lamp L1, L2, etc. indicates a false ground on one or more of the five associated marking distribution leads PU1, PU5, PU6 to PU10, etc.

(4) The operator will now actuate the keys such as K1–1, K2–1 . . . K5–1 associated with the lighted test lamp, say L1, until the one is found which extinguishes the respective lamp, since that key will open the connection to the grounded distribution lead. All the other keys, which are of the type which hold in their operated position, are then restored to normal. It will be noted that a circuit of a guard lamp GD1 is closed whenever one or more of the keys K1–1, K2–1, etc. are operated.

(5) As soon as the false ground is cleared the operated test key K1–1, K2–1, etc. may be restored. The alarm condition will remain until all five test keys T1, T2, etc. have been operated and all the associated locking relays MA, MB . . . ME thereby released.

While we have described above the principles of our invention in connection with specific apparatus, it is to be clearly understood that this description is made only by way of example and not as a limitation to the scope of our invention.

What is claimed is:

1. In a selective ringing party line telephone system, a signalling circuit adapted for selectively producing different signals, one for each station on a party line, a relay for connecting said circuit to a called party line, a ringing machine for periodically altering said circuit to produce successively different signals so as to signal each of the stations on said line in turn, a plurality of ringing control conductors each corresponding to a different signal of said signalling circuit, means for grounding each of said control conductors in turn, a circuit for said relay including the particular control conductor for energizing said relay only at the time that said signalling circuit is producing the signal for a wanted station on said party line, an alarm circuit, means for connecting said alarm circuit to said control conductors only when said control conductors are not grounded by said grounding means, and means for acting said alarm circuit responsive to the existence of an accidental ground on any one of said control conductors.

2. In a selective ringing party line telephone system, a signalling circuit adapted for selectively producing different signals, one for each station on a party line, a relay for connecting said circuit to a called party line, a ringing machine for periodically altering said circuit to produce successively different signals so as to signal each of the stations on said line in turn, a plurality of ringing control conductors each corresponding to a different signal of said signalling circuit, means for grounding each of said control conductors in turn for a predetermined time interval, a circuit for said relay including the particular control conductor for energizing said relay only at the time that said signalling circut is producing the signal for a wanted station on said party line, an alarm circuit, means for connecting said alarm circuit to said control conductors only when said control conductors are not grounded by said grounding means, and means for actuating said alarm circuit responsive to the existence of an accidental ground on any one of said control conductors if said accidental ground persists for a predetermined time interval.

3. A selective ringing party line telephone system, according to claim 1, further comprising supervisory signal means, and manually operable testing means for successively associating said control conductors with said supervisory signal means, whereby said last-mentioned means is actuated to indicate the identity of the particular control conductor on which said false ground exists.

4. A selective ringing party line telephone system according to claim 1, further comprising a supervisory lamp for each control conductor, a source of current connected to one side of each of said lamps, and individual switch means for connecting the other side of each of said lamps to said respective control conductors.

5. In a selective ringing party line telephone system, a party line, a connector switch at a central office for connecting with said line, a signalling conductor, a plurality of different sources of ringing current, means for connecting said sources with said conductor in succession, a plurality of control conductors, one for each of said sources, means for grounding each control conductor when its associated source is connected to said signalling conductor, a ringing relay in said connector for connecting said signalling conductor to said party line, a circuit for said relay including one of said control conductors, an alarm circuit, means for connecting said alarm circuit to said control conductors only when said control conductors are not grounded by said grounding means, and means for actuating said alarm circuit responsive to the existence of an accidental ground on any one of said control conductors.

6. In a selective ringing party line telephone system, a party line, a connector switch at a central office for connecting with said line, a signalling conductor, a plurality of different sources of ringing current, interrupter means, switch means controlled by said interrupter means for connecting said sources with said conductor in succession, a plurality of control conductors, one for each of said sources, switch means controlled by said interrupter means for grounding each control conductor for a predetermined time interval when its associated source is connected to said signalling conductor, a ringing relay in said connector for connecting said signalling conductor to said party line, a circuit for said relay including one of said control conductors, an alarm circuit, means for connecting said alarm circuit to said control conductors only when said control conductors are not grounded by said grounding means, and a delay relay means associated with said alarm circuit and with said control conductors for actuating said alarm circuit responsive to the existence of an accidental ground on any one of said control conductors if said accidental ground persists for a period exceeding the delay period of said relay means.

7. In a selective ringing party line telephone system, a party line, a connector switch at a central office for connecting with said line, a signalling conductor, a plurality of different sources of ringing current, means for connecting said sources with said conductor in succession, a plurality of groups of control conductors, one group for each of said sources, means for grounding each control conductor when its associated source is connected to said signalling conductor, a ringing relay in said connector switch for connecting said signalling conductor to said party line, a circuit for said relay including one of said control conductors, a plurality of other relay means each individual to a group of control conductors, means for actuating one of said other relay means responsive to the existence of an accidental ground on any control conductor of the group associated therewith, and means responsive to said other relay means for isolating one from another the respective control conductors of said groups of control conductors.

8. A selective ringing party line telephne system, according to claim 7, in which said last-mentioned isolating means comprises a plurality of rectifiers, one inserted in each said control conductor, and further comprising circuits for normally shunting said rectifiers and means under the control of said other relay means for opening said shunt circuits.

9. A selective ringing party line telephone system, according to claim 8, further comprising a plurality of supervisory testing lamps, one for each said group of control conductors, a source of current connected to one side of each of said lamps, a plurality of first test keys, one for each said group of control conductors, a plurality of second test keys, one for each said control conductor in a group, first switch means controlled by said first test keys for connecting the other sides of said lamps to the respective group of control conductors, and second switch means controlled by said second test keys for selectively opening said shunt circuits.

10. In a selective ringing party line telephone system, a signalling conductor, first and second sets of ringing generators for generating ringing currents of different frequencies, a first interrupter mechanism for connecting the respective generators of said first set in succession to said signalling conductor for predetermined time periods, a second interrupter mechanism for connecting the respective generators of said second set in succession to said signalling conductor for predetermined time periods, switch means for transferring said signalling conductor from said first interrupter mechanism to said second interrupter mechanism, and actuating means for said switch means responsive to a lack of current from any of the ringing generators of said first set.

11. A selective ringing party-line telephone system, according to claim 10, further comprising a first electric motor for normally driving said first set of ringing generators and said first interrupter mechanism, a second electric motor for driving said second set of ringing generators and said second interrupter mechanism, electric power supply leads normally connected to said first motor, an electric battery, a switch for connecting said electric battery to said second motor and actuating means for said last-mentioned switch responsive to a failure of the power current supply to said first motor.

12. A selective ringing party-line telephone system, according to claim 11, further comprising means responsive to the power current supply to said first motor being restored after failure for automatically restoring said last-mentioned switch to disconnect said battery from said second motor and for effecting the re-transfer for said signalling conductor from said second interrupter means to said first interrupter means.

13. In a selective ringing party-line telephone system, a signalling conductor, first and second sets of ringing generators for generating ringing current of different frequencies, a first interrupter mechanism for connecting the respective generators of said first set in succession to said signalling conductor for predetermined time periods, a second interrupter mechanism for connecting the respective generators of said second set in succession to said signalling conductor for predetermined time periods, switch means for transferring said signalling conductor from said first interrupter mechanism to said second interrupter mechanism, a set of first relays, means for energizing said relays from the respective outputs of the generators of said first set of ringing generators, a thermal relay, parallel circuits for said thermal relay extending over contacts of said first relays, and means controlled by said thermal relay for actuating said switch means.

14. In a selective ringing party line telephone system, a signalling conductor, first and second sets of ringing generators for generating ringing current of different frequencies, a first interrupter mechanism for connecting the respective generators of said first set in succession to said signalling conductor for predetermined time periods, a second interrupter mechanism for connecting the respective generators of said second set in succession to said signalling conductor for predetermined time periods, an alternating current motor for driving said first set of generators and said first interrupter mechanism, a direct current motor for driving said second set of generators and said second interrupter mechanism, a source of direct current, change-over switch means for transferring said signalling conductor from said first interrupter mechanism to said second interrupter mechanism, first relay means responsive to a failure of the alternating current-power supply to said alternating current motor, a thermal relay, a circuit for said thermal relay including contacts of said first relay means, a second relay means, a circuit for said second relay means including contacts of said thermal relay, means responsive to the operation of said second relay means for connecting said source of direct current to said direct current motor and for actuating said change-over switch means.

15. A selective ringing party line telephone system, according to claim 14, in which said last-mentioned means for actuating said change-over switch means comprises a further relay, a negative resistance device, and a circuit for said relay including contacts of said second relay means and said negative resistance device.

16. A selective ringing party line telephone system, according to claim 14, in which said second relay means comprises a double-wound relay having two opposing windings, and further comprising a second thermal relay, a circuit for one winding of said double wound relay including contacts of said first-mentioned thermal relay, a circuit for the other winding of said double-wound relay including contacts of said second thermal relay, and means responsive to the reenergization of said alternating current motor after a failure of the alternating current supply for energizing said second thermal relay, so as to cause current to flow in said other winding of said double-wound relay and thus to release said relay.

References Cited in the file of this patent

UNITED STATES PATENTS

| | | |
|---|---|---|
| 1,990,569 | Shiel et al. | Feb. 12, 1935 |
| 2,659,770 | Elliott | Nov. 17, 1953 |
| 2,694,106 | Mills | Nov. 9, 1954 |
| 2,740,845 | Mills et al. | Apr. 3, 1956 |